United States Patent [19]
Ciokajlo et al.

[11] Patent Number: 5,142,858
[45] Date of Patent: Sep. 1, 1992

[54] COMPACT FLAMEHOLDER TYPE COMBUSTOR WHICH IS STAGED TO REDUCE EMISSIONS

[75] Inventors: John J. Ciokajlo; Harvey M. Maclin, both of Cincinnati, Ohio

[73] Assignee: General Electric Company, Cincinnati, Ohio

[21] Appl. No.: 616,966

[22] Filed: Nov. 21, 1990

[51] Int. Cl.$^5$ .......................... F02C 7/228; F02C 9/34
[52] U.S. Cl. ...................................... 60/39.33; 60/733; 60/746; 60/749
[58] Field of Search ....................... 60/39.33, 733, 737, 60/738, 743, 746, 747, 748, 749, 261

[56] References Cited

U.S. PATENT DOCUMENTS

| | | | |
|---|---|---|---|
| 2,592,110 | 4/1952 | Berggren et al. | |
| 2,773,350 | 12/1956 | Barrett et al. | 60/746 |
| 2,780,916 | 2/1957 | Collins | 60/270.1 |
| 2,920,445 | 1/1960 | Bailey | |
| 2,964,907 | 12/1960 | Toone | |
| 2,967,394 | 1/1961 | Jensen | 60/737 |
| 2,974,488 | 3/1961 | Eggers et al. | 60/746 |
| 2,999,359 | 9/1961 | Murray | 60/733 |
| 3,269,116 | 8/1966 | Frasca et al. | |
| 3,670,497 | 6/1972 | Sheldon | |
| 3,931,707 | 1/1976 | Vdoviak | 60/261 |
| 4,052,844 | 10/1977 | Carvel et al. | 60/738 |
| 4,168,609 | 9/1979 | Greenberg et al. | 60/39.36 |
| 4,237,694 | 12/1980 | Wood et al. | 60/738 |
| 4,259,839 | 4/1981 | Labourne et al. | 60/261 |
| 4,271,674 | 6/1981 | Marshall et al. | 60/737 |
| 4,301,656 | 11/1981 | Stettler | 60/737 |
| 4,445,339 | 5/1984 | Davis, Jr. et al. | 60/749 |
| 4,490,973 | 1/1985 | Kinsey | |
| 4,802,337 | 2/1989 | Caruel | 60/749 |
| 4,955,191 | 9/1990 | Okamoto et al. | 60/746 |

OTHER PUBLICATIONS

D. L. Burrus et al., Energy Efficient Engine-Combustion System Component Technology Development Report, NASA Report R82AEB 401, Nov. 1982, pp. Cover, title 1-37.

Primary Examiner—Richard A. Bertsch
Assistant Examiner—Timothy S. Thorpe
Attorney, Agent, or Firm—Jerome C. Squillaro; James P. Davidson

[57] ABSTRACT

A combustor includes spaced outer and inner liners defining therebetween a combustion zone, and having a plurality of circumferentially spaced tubular domes disposed between forward ends thereof. Each of the domes includes an annular inlet for receiving pilot airflow, a swirler having a tubular ferrule and primary swirl vanes for receiving the pilot airflow, and an outlet disposed in flow communication with the combustion zone. A pilot fuel injector is disposed in each of the domes for injecting pilot fuel into the pilot airflow for generating a pilot fuel/air mixture dischargeable from the dome outlet. A plurality of main fuel spraybars inject main fuel into compressed airflow channeled between the domes and the outer and inner liners for generating a main fuel/air mixture dischargeable concentrically around the pilot fuel/air mixture. And, the pilot fuel/air mixture is ignited for generating pilot combustion gases in the combustion zone which are effective for igniting the main fuel/air mixture for generating main combustion gases in the combustion zone.

18 Claims, 6 Drawing Sheets

5,142,858

COMPACT FLAMEHOLDER TYPE COMBUSTOR WHICH IS STAGED TO REDUCE EMISSIONS

TECHNICAL FIELD

The present invention relates generally to gas turbine engines, and, more specifically, to a combustor effective for reducing $NO_x$ emissions.

BACKGROUND ART

Commercial, or civil, aircraft are conventionally designed for reducing exhaust emissions from combustion of hydrocarbon fuel such as, for example, Jet-A fuel. The exhaust emissions may include hydrocarbon particulate matter, in the form of smoke for example, carbon monoxide, and nitrogen oxides ($NO_x$) such as, for example nitrogen dioxide $NO_2$. $NO_x$ emissions are known to occur from combustion at relatively high temperatures, for example, over 3,000° F. (1648° C.). These temperatures occur when fuel is burned at fuel/air ratios at or near stoichiometric, i.e. at an equivalence ratio of 1.0 which represents the actual fuel-air ratio divided by the stoichiometric fuel/air ratio. The amount of emissions formed is directly related to the time that combustion takes place at these conditions, i.e., residence time.

Conventional gas turbine engine combustors for use in an engine for powering an aircraft are conventionally sized and configured for obtaining varying fuel equivalence ratios during the varying power output requirements of the engine such as, for example, lightoff, idle, takeoff, and cruise modes of operation of the engine in the aircraft. At relatively low power modes, such as at lightoff and idle, a relatively rich fuel/air mixture with an equivalence ratio greater than one is desired for initiating combustion and maintaining stability of the combustion. At relatively high power modes, such as for example cruise and takeoff operations of the engine in the aircraft, a relatively lean fuel/air mixture with an equivalence ratio less then one is desired for obtaining reduced exhaust emissions.

In the cruise mode, for example, where an aircraft gas turbine engine operates for a substantial amount of time, conventional combustors are typically sized for obtaining combustion at generally stoichiometric fuel/air ratios, equivalence ratio of 1.0, in the dome region, which represents theoretically complete combustion. However, in practical applications, exhaust emissions nevertheless occur, and conventional combustors utilize various means for reducing exhaust emissions.

As government exhaust emissions regulations become stricter, most notably, those regulations relating to $NO_x$ emissions, gas turbine engine combustors will require improved means for reducing such emissions. This is true for, most significantly, gas turbine engine powered commercial aircraft, as well as military aircraft and marine and industrial (M&I) gas turbine engines. Furthermore, the trend in present gas turbine engine design is to decrease engine, and combustor, length for reducing weight and parasitic cooling air requirements for increasing engine efficiency and specific fuel consumption among other things. However, combustion gases discharged from a combustor must have relatively uniform temperature distribution for obtaining acceptable life of turbine nozzle vanes and rotor blades disposed downstream therefrom. Accordingly, combustor length reduction is limited by the ability to effectively mix the combustion gases therein for obtaining relatively uniform combustion gas exit temperature.

OBJECTS OF THE INVENTION

Accordingly, one object of the present invention is to provide a new and improved combustor for a gas turbine engine.

Another object of the present invention is to provide a combustor effective for reducing $NO_x$ emissions.

Another object of the present invention is to provide a combustor effective for operating over a broad range of engine power conditions.

Another object of the present invention is to provide a combustor which is relatively short and lightweight.

Another object of the present invention is to provide a combustor having improved mixing of the combustion gases therein for reducing exhaust emissions and for providing a relatively uniform combustion gas exit temperature.

DISCLOSURE OF INVENTION

A combustor includes spaced outer and inner liners defining therebetween a combustion zone, and having a plurality of circumferentially spaced tubular domes disposed between forward ends thereof. Each of the domes includes an annular inlet for receiving pilot airflow, a swirler having a tubular ferrule and primary swirl vanes for receiving the pilot airflow, and an outlet disposed in flow communication with the combustion zone. A pilot fuel injector is disposed in each of the domes for injecting pilot fuel into the pilot airflow for generating a pilot fuel/air mixture dischargeable from the dome outlet. A plurality of main fuel spraybars inject main fuel into compressed airflow channeled between the domes and the outer and inner liners for generating a main fuel/air mixture dischargeable concentrically around the pilot fuel/air mixture. And, means for igniting the pilot fuel/air mixture are provided for generating pilot combustion gases in the combustion zone which are effective for igniting the main fuel/air mixture for generating main combustion gases in the combustion zone.

BRIEF DESCRIPTION OF THE DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
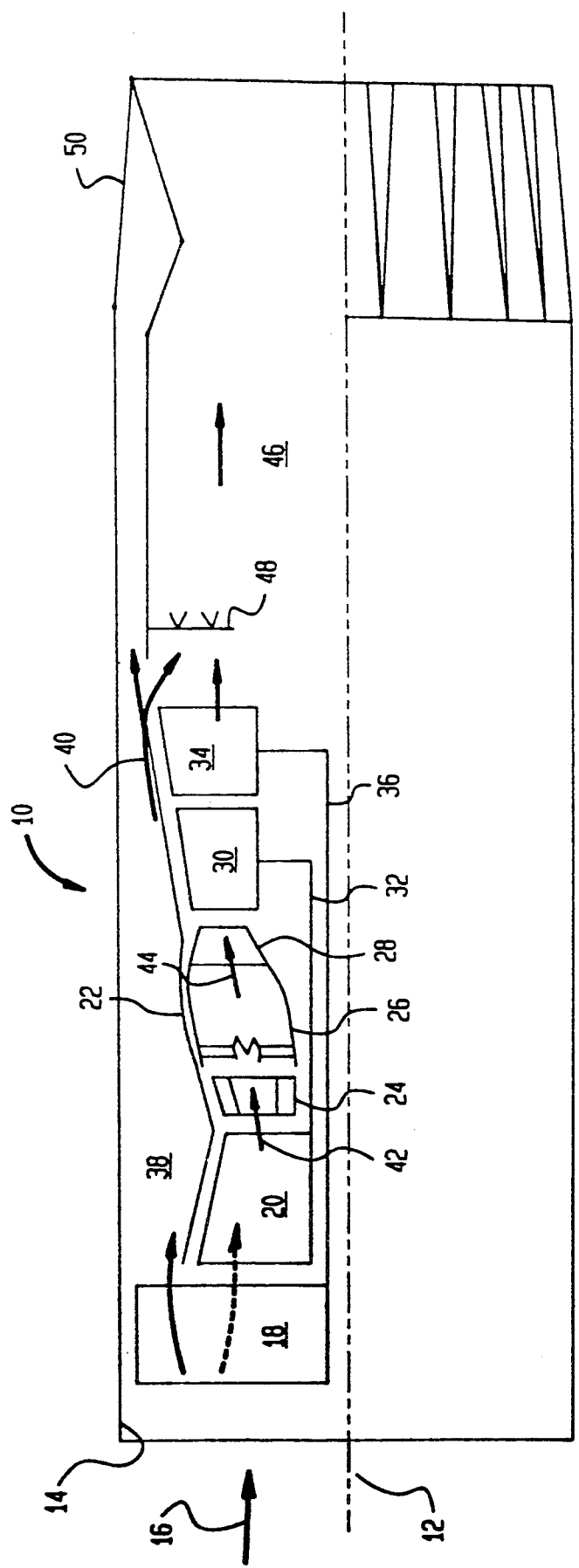
FIG. 1 is a centerline sectional schematic view of an exemplary turbofan gas turbine engine having a combustor in accordance with one embodiment of the present invention.

Illustrated in FIG. 1 is an exemplary turbofan gas turbine engine 10 for powering an aircraft during conventional modes of operation including, for example, lightoff, idle, takeoff, cruise and approach. Disposed concentrically about a longitudinal centerline axis 12 of the engine 10 in serial flow communication are a conventional inlet 14 for receiving ambient air 16, a conventional fan 18, and a conventional high pressure compressor (HPC) 20 disposed in a conventional annular outer casing 22. A conventional multi-channel diffuser 24 is disposed in flow communication with the HPC 20, which is followed in turn by a combustor 26 in accordance with a preferred and exemplary embodiment of the present invention.

Disposed downstream of and in flow communication with the combustor 26 is a high pressure turbine (HP) nozzle 28 followed in turn by a conventional high pressure turbine (HPT) 30 for powering the HPC 20 through a conventional HP shaft 32 extending therebetween. A conventional low pressure turbine (LPT) 34 is disposed downstream of and in flow communication with the HPT 30 for powering the fan 18 through a conventional LP shaft 36 extending therebetween. The outer casing 22 extends from the HPC 20 to the LPT 34 and is surrounded by a conventional bypass duct 38 for channeling a portion of the ambient air 16 compressed in the fan 18 as bypass air 40.

A portion of the air 16 which is not bypassed, is channeled into the HPC 20 which generates compressed airflow 42 which is discharged from the HPC 20 into the diffuser 24. The compressed airflow 42 is mixed with fuel as further described hereinbelow and ignited in the combustor 26 for generating combustion gases 44 which are channeled through the HPT 30 and the LPT 34 and discharged into a conventional afterburner, or augmentor, 46 extending downstream from the LPT 34. The augmentor 46 is optional and may be incorporated in the engine 10 if required by the particular engine cycle, for example for use in a military aircraft. For a commercial or M&I gas turbine engine application, the afterburner 46 would typically not be utilized.

In a dry mode of operation, the afterburner 46 is deactivated and the combustion gases 44 are simply channeled therethrough. In a wet, or activated mode of operation, additional fuel is mixed with the combustion gases 44 and the bypass air 40 in a conventional fuel injector/flameholder assembly 48 and ignited for generating additional thrust from the engine 10. The combustion gases 44 are discharged from the engine 10 through a conventional exhaust nozzle 50, such as a variable area exhaust nozzle, extending downstream from the afterburner 46.

Figure 2:
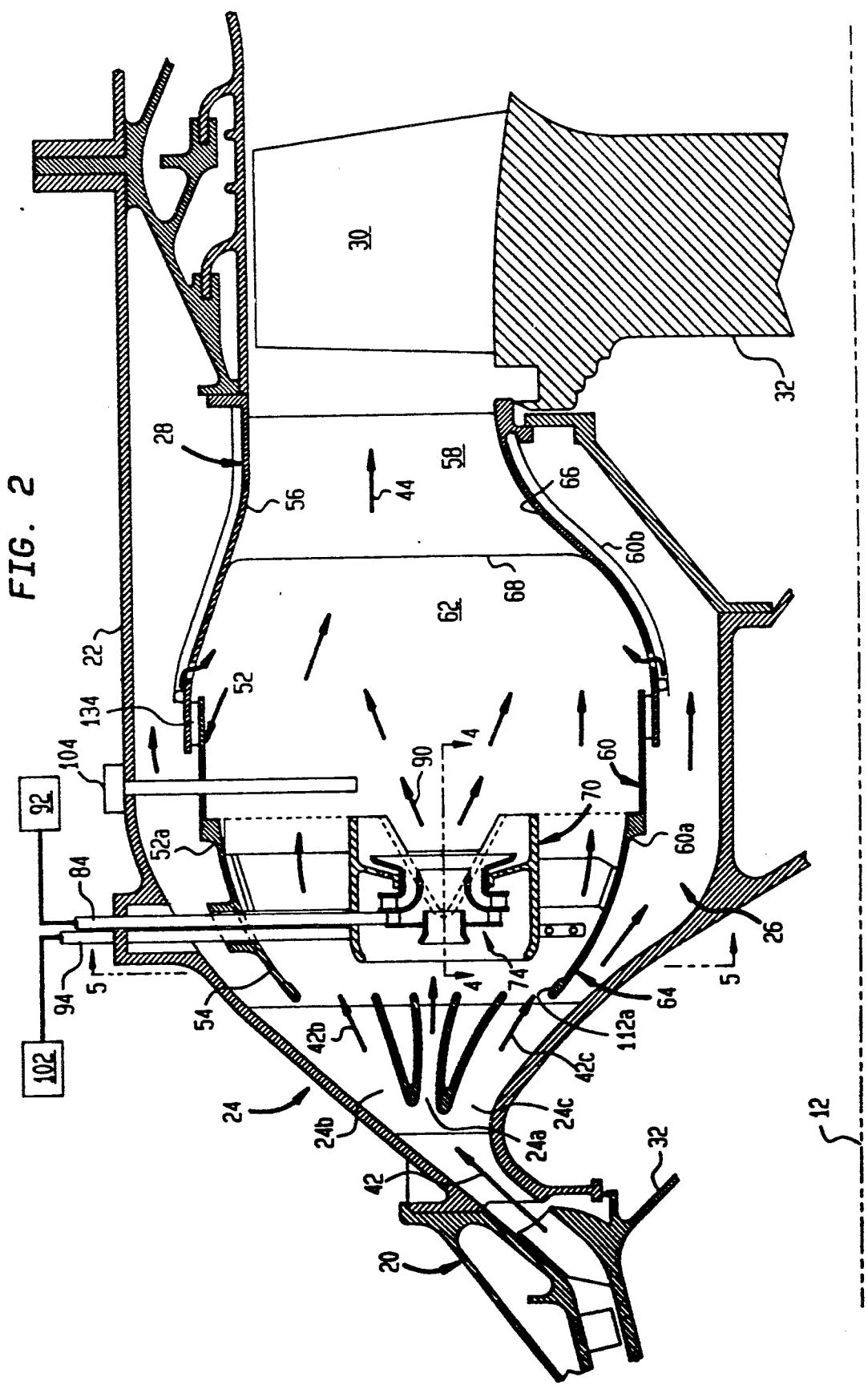
FIG. 2 is an enlarged centerline sectional view of a portion of the combustor and adjacent structures illustrated in FIG. 1.
Figure 3:
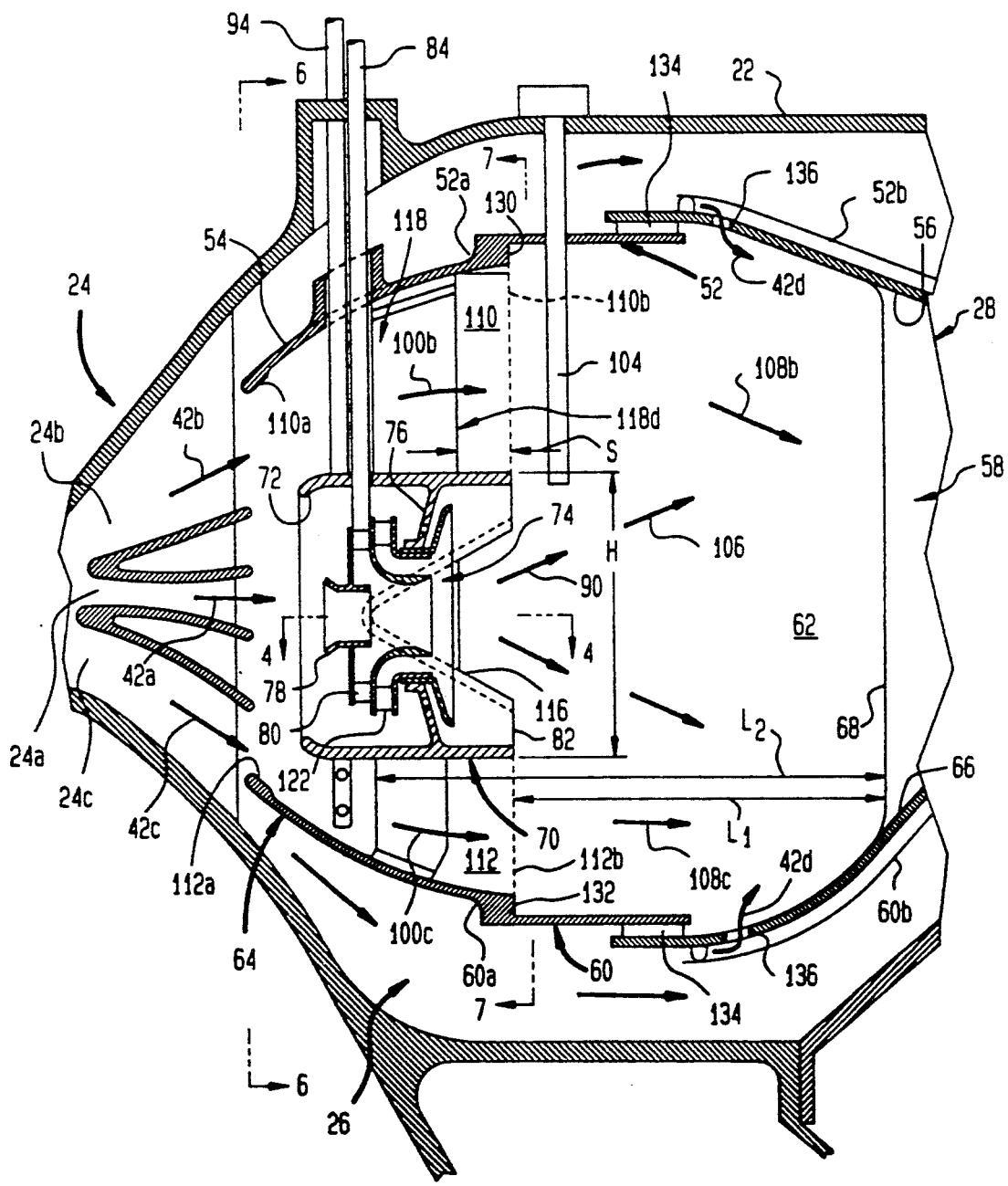
FIG. 3 is an enlarged longitudinal sectional view of the combustor illustrated in FIG. 2.

Illustrated in more particularity in FIGS. 2 and 3 is the combustor 26 in accordance with a preferred embodiment of the present invention. The combustor 26 includes an annular outer liner 52 disposed coaxially about the centerline axis 12 which has a forward end 52a and an aft end 52b. An annular outer cowl 54 extends upstream from the outer liner 52 at the forward end 52a, and is preferably formed integrally therewith. The outer liner aft end 52b is preferably formed integrally with an annular outer band 56 of the HP nozzle 28 which supports radially outer ends of conventional, circumferentially spaced nozzle vanes 58 extending radially inwardly therefrom.

The combustor 26 also includes an annular inner liner 60 disposed coaxially about the centerline axis 12 and spaced radially inwardly from the outer liner 52 to define therebetween an annular combustion zone 62. The inner liner 60 includes a forward end 60a and an aft end 60b. An annular inner cowl 64 extends upstream from the inner liner 60 at the forward end 60a, and is preferably formed integrally therewith. The inner liner aft end 60b is preferably formed integrally with a radially inner band 66 of the HP nozzle 28 which supports the radially inner ends of the vanes 58. The outer liner aft end 52b and the inner liner aft end 60b define therebetween a combustor outlet 68 for discharging the combustion gases 44 into the HP nozzle 28.

A plurality of circumferentially spaced tubular domes 70 are fixedly joined to and spaced between the outer and inner liner forward ends 52a and 60a, with each of the domes 70 including an annular dome inlet 72 disposed at the forward end of the dome 70 for receiving a portion of the compressed airflow as pilot airflow 42a. In the preferred embodiment eighteen domes 70 are used, although fewer or more domes 70 may be alternatively used as required for reducing hot streaks. The diffuser 24 is a conventional multi-passage diffuser having an annular central passage 24a which is radially aligned with the dome inlets 72 for channeling the pilot airflow 42a thereto.

Figure 4:
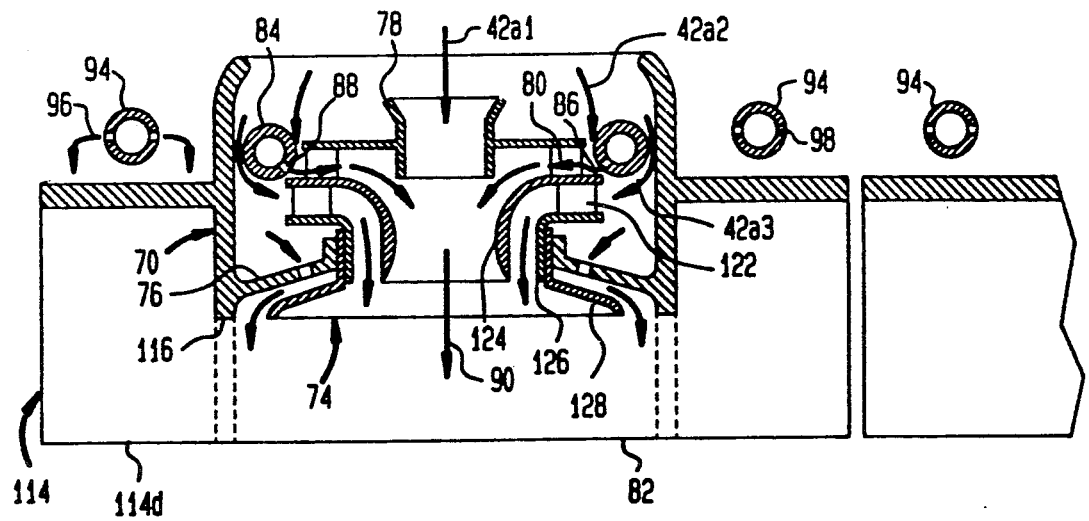
FIG. 4 is a circumferential sectional view through the combustor domes illustrated in FIG. 3 taken along line 4—4.

A conventional swirler 74, and in this exemplary embodiment, a counter-rotational swirler, is fixedly disposed inside each of the domes 70, and, for example, may be conventionally brazed to a circular plate 76 formed integrally near the center of the dome 70. The swirler 74 includes a central tubular ferrule 78 for receiving a first portion of the pilot airflow 42a, designated 42a1 as illustrated in more particularity in FIG. 4. The swirler 74 also includes a plurality of conventional, circumferentially spaced primary swirl vanes 80 for receiving and swirling a second portion of the pilot airflow 42a, designated 42a2, also as illustrated in FIG. 4. An annular dome outlet 82 is disposed at the aft end of the dome 70 in flow communication with the ferrule 78, primary swirl vanes 80 and the combustion zone 62.

As illustrated in FIGS. 2–4, a plurality of pilot fuel injectors 84 are provided with at least one pilot injector 84 being disposed in a respective one of the domes 70 for injecting pilot fuel 86 from a pilot fuel orifice 88 disposed at an aft end thereof into the pilot airflow second portion 42a2 for mixing therewith and for mixing with the pilot airflow first portion 42a1 discharged from the ferrule 78 for generating a pilot fuel/air mixture 90 which is discharged from the dome outlet 82 during operation. The pilot fuel injectors 84 are preferably conventional airblast type injectors, although conventional duplex-type injectors could also be used. The pilot fuel 86 is conventionally provided to the pilot injectors 84 by a conventional pilot fuel supply and control means 92.

A plurality of main fuel spraybars 94 extend between the domes 70 and the outer and inner liners 52 and 60 through the outer cowls 54. Each of the spraybars 94 includes a plurality of radially spaced main fuel orifices 98 for selectively injecting main fuel 96 into a portion of the compressed airflow 42 channeled between the domes 70 and the outer and inner liners 52 and 60 as main airflow 42b and 42c, respectively, for mixing therewith for generating outer and inner main fuel/air mixtures 100b and 100c, respectively. The main fuel 90 is selectively provided to the spraybars 94 from a conventional main fuel supply and control means 102. The outer and inner main fuel/air mixtures 100b and 100c are discharged concentrically, radially outwardly and radially inwardly, respectively, around the pilot fuel/air mixture 90 as illustrated in FIG. 3.

The outer main airflow 42b is channeled between the dome 70 and the outer cowl 54 from a diffuser outer passage 24b aligned therewith, and the inner main airflow 42c is channeled between the dome 70 and the inner cowl 64 from a diffuser inner passage 24c aligned therewith.

Means for igniting the pilot fuel/air mixture 90, such as a conventional igniter 104, are provided for generating pilot combustion gases 106 in the combustion zone 62. The igniter 104 extends radially inwardly from the outer casing 22 and through the outer liner 52 and has its igniter end disposed immediately downstream of the dome outlet 82. The pilot combustion gases 106 are effective for igniting the main fuel/air mixtures 100b and 100c for generating outer and inner main combustion gases 108b and 108c, respectively, in the combustion zone 62. The pilot combustion gases 106 and the main combustion gases 108b, 108c collectively form the combustion gases 44 discharged from the combustor outlet 68 into the HP nozzle 28.

As illustrated in FIG. 3, the outer cowl 54 is spaced radially outwardly from the domes 70 to define therebetween an annular outer flowpath 110 having an annular outer inlet 110a for receiving the outer main airflow 42b, and an annular outer outlet 110b for discharging the outer main fuel/air mixture 100b into the combustion zone 62.

The inner cowl 64 is spaced radially inwardly from the domes 70 to define therebetween an annular inner flowpath 112 having an annular inner inlet 112a for receiving the inner main airflow 42c, and an annular inner outlet 112b for discharging the inner main fuel/air mixture 100c into the combustion zone 62.

Figure 5:
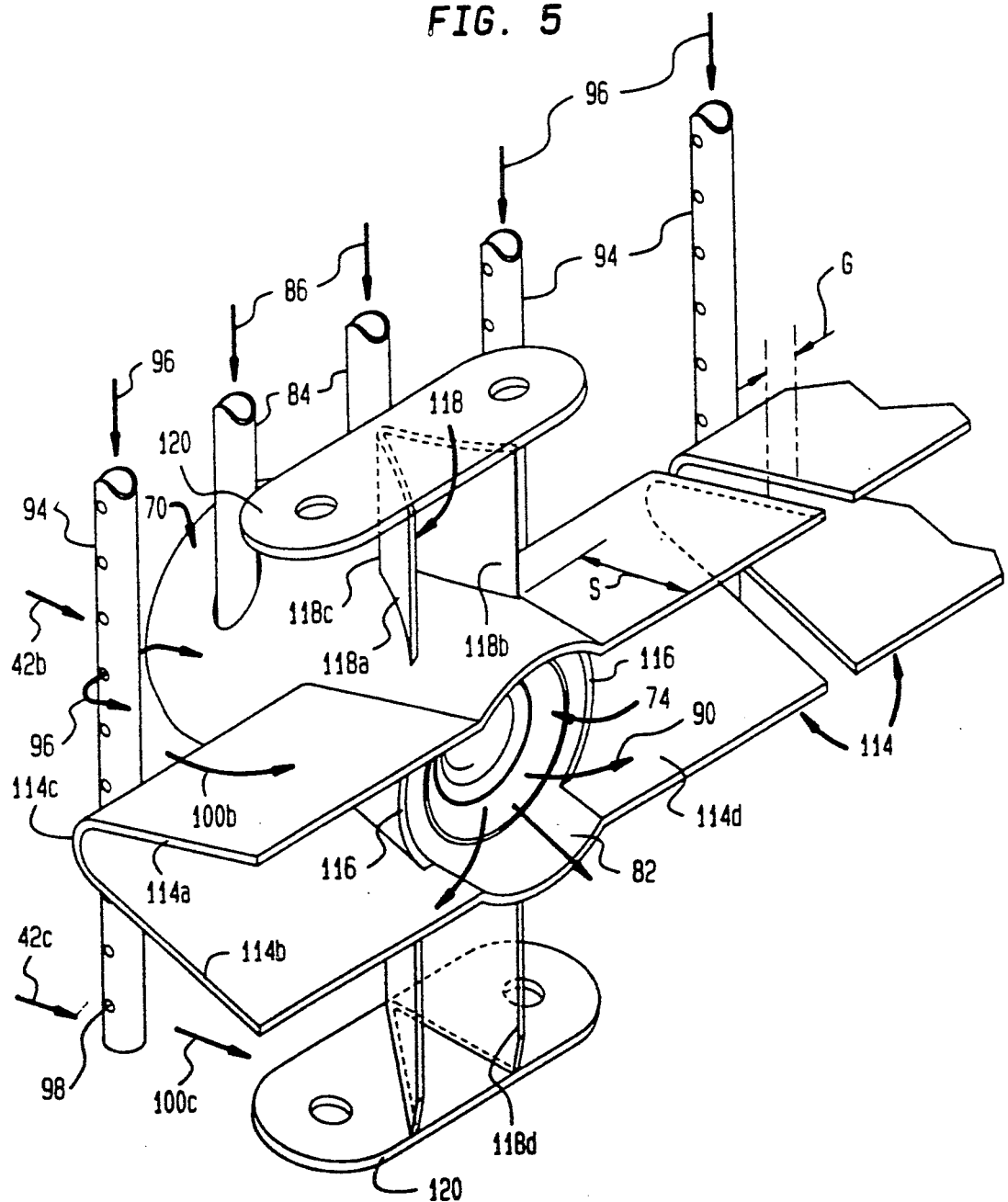
FIG. 5 is a perspective view of a portion of the domes, gutters, fuel injectors and spraybars illustrated in FIG. 3.

As illustrated, for example, in FIG. 5, each of the domes 70 further includes a first, or circumferential V-type gutter 114 extending circumferentially from both sides of the domes 70 which is preferably formed as an integral casting or fabrication therewith. Each of the gutters 114 includes diverging outer and inner legs 114a and 114b, respectively, joined together at a first leading edge, or apex, 114c. The downstream ends of the legs 114a and 114b define therebetween a first gutter outlet 114d, which as described hereinbelow is preferably in flow communication with the swirler 74 for receiving therefrom the pilot fuel/air mixture 90.

Adjacent ones of the circumferential gutters 114 are circumferentially spaced from each other to define a circumferential gap G for accommodating differential thermal movement therebetween. During operation, the gutters 114 will expand and contract, and the circumferential gap provides for such expansion and contraction without binding between adjacent gutters 114. Although in the preferred embodiment, eighteen domes 70 are used with each dome including a separate circumferential gutter 114 formed integrally therewith, the circumferential gutter 114 may, in alternate embodiments, comprise a full 360° annular ring formed integrally with all of the domes 70, or may form segments joining two or more domes 70.

Figure 6:
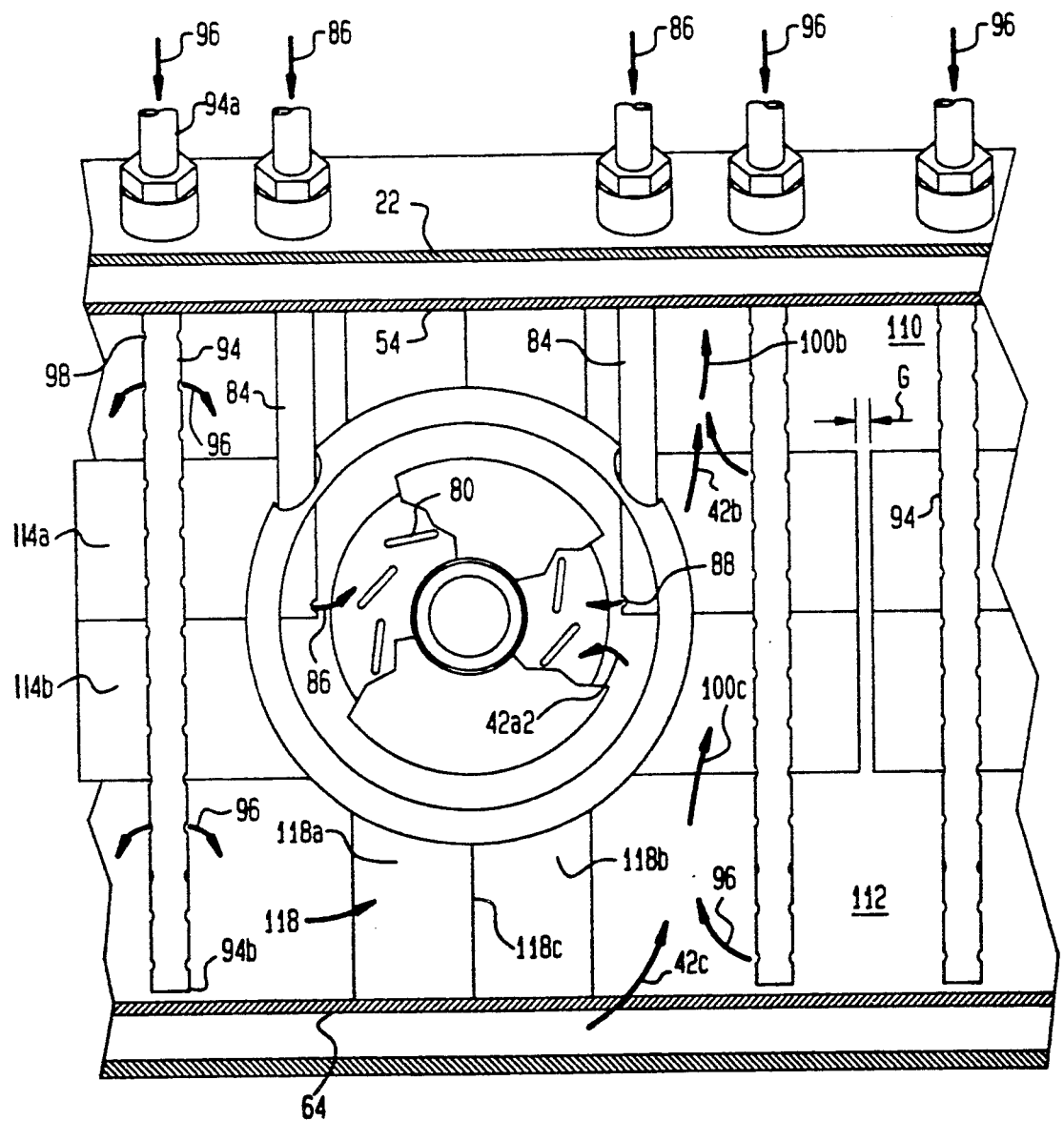
FIG. 6 is an aft facing, partly sectional, view of the combustor illustrated in FIG. 3 taken along line 6—6.

As illustrated in FIG. 6, for example, the gutter outer legs 114a, along with the outer portion of the domes 70 form one boundary of the outer flowpath 110, with the other boundary being formed by the outer cowl 54. The inner legs 114b along with the inner portion of the dome 70 form one boundary of the inner flowpath 112, with the other boundary being formed by the inner cowl 64. The diverging legs 114a, 114b of the circumferential gutters 114 provide enhanced mixing of the pilot combustion gases 106 flowing downstream from the domes 70 with the outer and inner main combustion gases 108b, 108c flowing downstream from the outer and inner flowpaths 110 and 112.

Figure 7:
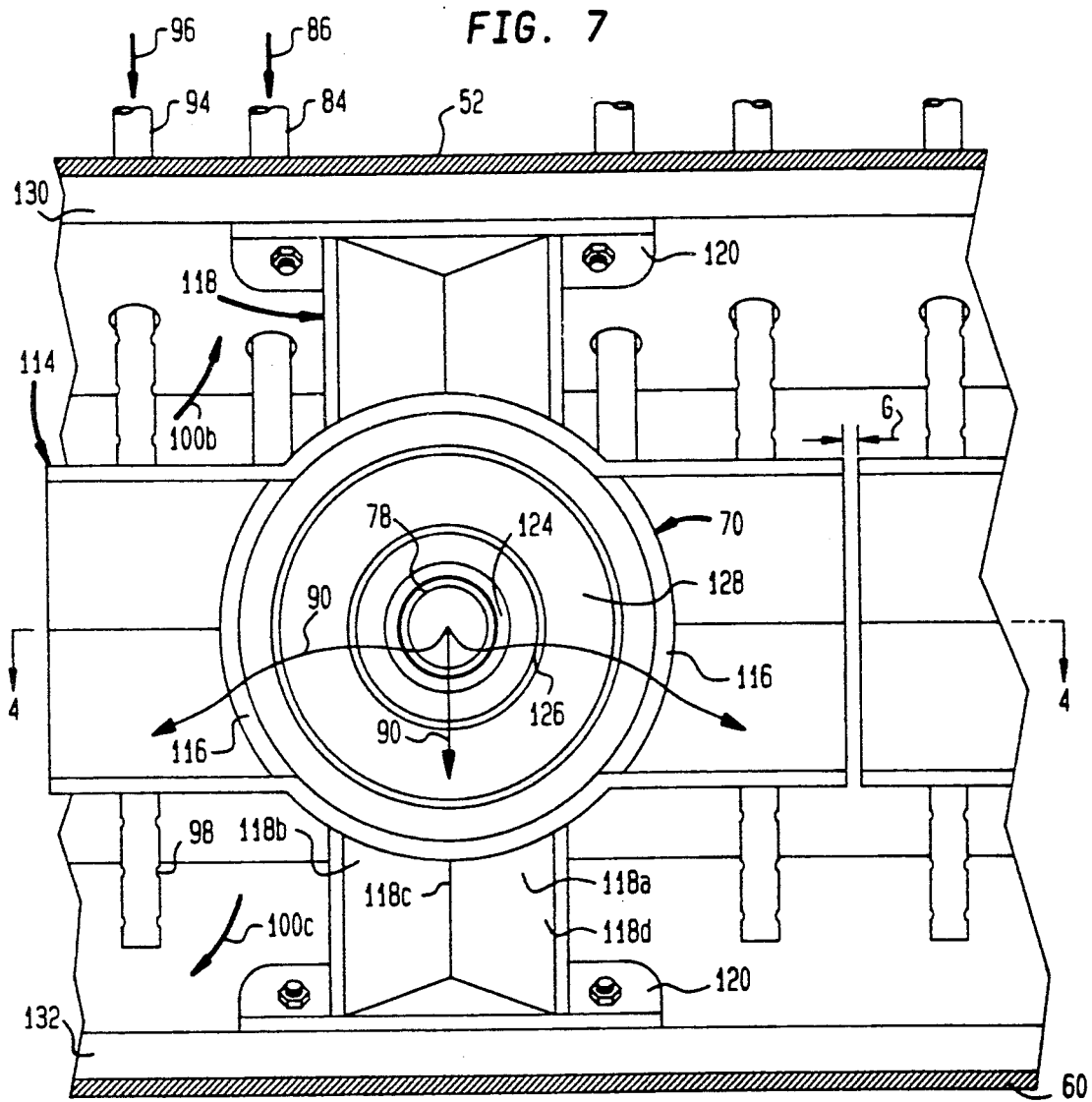
FIG. 7 is a forward facing, partly sectional, view of the combustor illustrated in FIG. 3 taken along line 7—7.

To further improve mixing effectiveness and cross firing, each of the domes 70 further includes a pair of recesses 116, as illustrated in FIGS. 3, 5, and 7 which extend upstream from the dome outlet 82 on opposite sides of the dome 70 for allowing the pilot fuel/air mixture 90 to spread circumferentially inside the circumferential gutter 114 and be discharged from both the dome outlet 82 and the first gutter outlet 114d.

Referring again to FIGS. 5-7, each of the domes 70 further includes a second, or radial V-type gutter 118 extending radially from both the top and bottom of the dome 70, preferably being an integral casting therewith, and having diverging first and second side legs 118a and b joined together at a second leading edge, or apex, 118c, and a radially extending second gutter outlet 118d defined at downstream ends thereof. Since the side legs 118a and 118b diverge in a downstream direction, they are effective for additionally mixing the main fuel 96 from the spraybars 94 with the outer and inner main airflows 42b and 42c, respectively.

As illustrated in FIG. 3, the second gutter outlet 118d is preferably disposed upstream from the dome outlet 82 at a setback distance S for increasing mixing of the main fuel 96 with the outer and inner main airflows 42b and 42c. In this way, the main fuel 96 is mixed, or premixed, with the main airflow before being discharged from the outer and inner flowpath outlets 110b and 112b. Since the radial gutters 118 are subject to being heated by radiation from the combustion gases in the combustion zone 62, they are therefore effective for partially vaporizing the main fuel 96 flowing thereover for increasing mixing effectiveness and combustion rate of the main fuel/air mixtures 100b, 100c. The degree of premixing for particular designs will determine the number of main fuel spraybars 94, the setback distance S, and the length of the combustion zone 62, and will be conventionally designed to obtain acceptable pre-ignition margin at all operating conditions.

As illustrated in FIGS. 5 and 7, the radial gutters 118 preferably include integral support plates 120 at their radial outer and inner ends for fixedly supporting the domes 70 to the outer and inner cowls 54 and 64 by conventional bolts, for example.

As illustrated in FIG. 4, each of the swirlers 74 preferably further includes a plurality of circumferentially spaced secondary swirl vanes 122 disposed downstream from the primary swirl vanes 80 for receiving and swirling, in a direction opposite to that of the primary vanes 80, a third portion of the pilot airflow 42a, designated 42a3. The pilot airflow third portion 42a3 is discharged from the secondary swirl vanes 122 concentrically around the pilot fuel 86 and pilot airflow first and second portions 42a1 and 42a2 for mixing therewith to generate the pilot fuel/air mixture 90 discharged from the dome outlet 82.

The swirler 74 is conventional and further includes a primary venturi 124 formed integrally with the primary and secondary vanes 80 and 122, and a secondary venturi 126 formed integrally with the secondary swirl vanes 122. A conventional annular baffle 128 is conventionally secured, by brazing for example, in the dome plates 76, and the secondary venturi 126 is fixedly joined to the baffle 128, by brazing for example, for fixedly mounting the swirler 74 inside the dome 70. The baffle 128 is conventionally cooled by another portion of the pilot airflow 42a channeled through conventional apertures in the dome plate 76.

Also as illustrated in FIG. 4, the ferrule 78 is flared outwardly at its upstream end for receiving the pilot airflow first portion 42a1. Unlike a conventional swirler wherein a fuel injector is disposed inside the ferrule 78, the ferrule 78 is preferably empty for channeling without obstruction the pilot airflow first portion 42a1, with the pilot fuel 86 being provided by the pilot fuel injectors 84 disposed tangentially to the primary swirl vanes 80. In this way, the pilot fuel 86 is mixed with the pilot airflow second portion 42a2 and channeled through the primary swirl vanes 80, and the primary airflow first portion 42a1 is effective for drawing through the primary swirl vanes 80, through an ejector effect, the pilot fuel 86 and the airflow first portion 42a1. This provides for enhanced mixing of the pilot fuel 86 and the pilot airflow 42a.

As illustrated in FIGS. 4 and 6, the pilot orifices 88 are preferably disposed adjacent to respective pairs of the primary swirl vanes 80 for discharging the pilot fuel 86 between the vanes 80 for mixing with the pilot airflow second portion 42a2. Each of the pilot fuel injectors 84 preferably extends tangentially to the primary swirl vanes 80, i.e. tangentially to the circle about which the primary vanes are disposed. The pilot fuel injectors 84 are also preferably configured in pairs, with each pair providing pilot fuel 86 to a respective one of the swirlers 74. In alternate embodiments there may be only one pilot fuel injector 84 for each dome 70 and swirler 74.

As illustrated in FIG. 6, each of the spraybars 94 includes a proximal end 94a conventionally fixedly joined to the outer casing 22, for example at a boss thereof, and a distal end 94b disposed adjacent to the inner cowl 64. The spraybar orifices 98 are preferably uniformly spaced over the entire length of the spraybar 94 between the outer and inner cowls 54 and 64. The spraybar orifices 98 preferably face sideways. in the circumferential direction for increasing mixing of the main fuel 96 discharged therefrom with the outer and inner main airflows 42b and 42c. As illustrated, the spraybar orifices are preferably configured in opposing pairs.

During operation, the circumferential gutters 114 and the radial gutters 118 are effective for creating turbulence and increasing the mixing effectiveness between the fuel and airflows channeled thereover. Since the circumferential and radial gutters 114 and 118 face the combustion zone 62, they are heated by the combustion gases and are therefore effective for at least partially vaporizing the fuel channeled thereover. Accordingly, the resulting pilot and main fuel/air mixtures 90, 100b, and 100c burn more effectively and relatively quickly for reducing exhaust emissions and combustion residence time.

Furthermore, the pilot fuel injectors 84 and the swirlers 74 are preferably sized for providing a rich pilot fuel/air mixture 90 having an equivalence ratio preferably in a range of about 1.6 to about 1.8. The main fuel spraybars 94 and the outer and inner flowpaths 110 and 112 are sized for obtaining lean outer and inner main fuel/air mixtures 100b and 100c, with equivalence ratios preferably in a range of about 0.4 to about 0.6. These equivalence ratios are obtained from low to high power operation of the combustor 26. For example, at maximum power operation of the combustor 26, about 45% of the total fuel provided to the combustor 26 is provided through the pilot fuel injectors 84, and the remaining 55% of the fuel is provided through the main fuel spraybars 94. Correspondingly, about 20%, by weight flowrate of the compressed airflow 42 used for combustion, is channeled through the swirlers 74 for generating the pilot fuel/air mixtures 90, and the remaining 80% thereof is channeled through the outer and inner flowpaths 110 and 112 for generating the outer and inner main fuel/air mixtures 100b and 100c.

The pilot combustion gases 90 generated from the rich pilot fuel/air mixture 90 are effective for providing enhanced ignition and combustion of the outer and inner main fuel/air mixtures 100b and 100c for increasing the rate of combustion thereof, and, the lean main fuel/air mixtures 100b and 100c are effective for completing combustion of the rich pilot fuel/air mixture 90 and then quenching the pilot combustion gases 106. This decreases the formation of emissions, in particular $NO_x$ emissions.

Accordingly, as illustrated in FIG. 3, a relatively short and compact combustor 26 may be provided having a combustion zone length $L_1$ measured from the dome outlets 82 to the combustor outlet 68 at the leading edges of the nozzle vanes 58 which may be as small as about 3.0 inches (7.6 cm) or one and a half times the height H of the domes 70, whichever is larger. The overall combustor length $L_2$ as measured between the plane of fuel introduction at the pilot fuel injectors 84 and the combustor outlet 68 is correspondingly about 4.0 inches (10.2 cm), or twice the dome height H, whichever is larger.

In the preferred embodiment of the present invention, the pilot airflow 42a is provided to the domes 70 with a relatively low reference velocity of about 30 feet per second (9.1 meters per second) to ensure acceptable ignition of the pilot fuel/air mixture 90 and flame stability thereof. Combustor reference velocity is conventionally known and is the weight flowrate of the airflow divided by the airflow density and flow area. However, the main airflows 42b and 42c are preferably provided to the outer and inner flowpaths 110 and 112 at relatively high reference velocities in the range of about 60 to about 100 feet per second (18.3–30.0 meters per second). The relatively fast main airflows 42b and 42c are effective for increasing mixing effectiveness with the main fuel 96, as well as mixing effectiveness with the pilot combustion gases 106, and result in a relatively low combustion residence time, which may be as low as about one (1) millisecond.

At low power operation of the combustor 26, for example at idle, the main fuel supply and control means 102 preferably prevents flow of the main fuel 96 to the main fuel spraybars 94 with fuel being provided only by the pilot fuel injectors 84. The pilot combustion gases 90 are then rapidly quenched by the main airflows 42b and 42c channeled through the channels 110 and 112 for reducing $NO_x$ emissions. During intermediate power operation of the combustor 26, the main fuel control 102 provides fuel to all of the main fuel spraybars 94, or in an alternate embodiment may provide fuel to a select few of the main fuel spraybars 94 for maintaining acceptable local fuel/air mixtures. And, at maximum power operation of the combustor 26, such as for example takeoff, the main fuel supply 102 provides the main fuel 96 to all of the main fuel spraybars 94, and the pilot fuel injectors 84 may be turned off if desired. At intermediate and high power operations, the lean main combustion gases 108b, 108c complete combustion of the rich pilot fuel/air mixture 90 and then rapidly quench the pilot combustion gases 106 for reducing $NO_x$ emissions.

Also in the preferred embodiment, as illustrated in FIGS. 3 and 7, the outer liner 52 preferably includes an annular, aft facing outer step 130 at the forward end 52a thereof. The inner liner 60 similarly includes an annular, aft facing inner step 132 at the forward end 60a thereof. The outer and inner steps 130 and 132 are effective for providing flameholding of the outer and inner main combustion gases 108b and 108c. In the preferred embodiment, the outer and inner steps 130 and 132, the circumferential gutter outlets 114d, and the dome outlets 82 are all positioned at a common axial plane for providing flameholding of the pilot and outer and inner main combustion gases 90 and 108b, 108c. That common axial plane also defines the plane of the outer and inner flowpath outlets 110b and 112b.

Referring again to FIG. 3, the combustor outer and inner liners 52 and 60 preferably have forward portions which are formed integrally with the outer and inner cowls 54 and 64, respectively, as described above. The liners 52 and 60 preferably include aft portions which are formed integrally with the outer and inner bands 56 and 66 of the HP nozzle 28. In order to accommodate axial differential thermal movement between the forward portion of the combustor and the HP nozzle 28, the outer and inner liners 52 and 60 preferably include respective pluralities of circumferentially spaced standoffs 134 formed integrally with the forward portions of the liners 52 and 60, and are disposed in sliding engagement with the aft portions of the liners 52 and 60. A portion of the compressed airflow 42 flows between the standoffs 134 for providing film cooling of the liners 52 and 60. A plurality of conventional, circumferentially spaced dilution apertures 136 are provided in both the outer and inner liners 52 and 60 for providing a portion of the compressed airflow 42 as dilution airflow 42d into the combustion zones 62 for additionally quenching and diluting the combustion gases 44.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A combustor for receiving compressed airflow from a compressor in a gas turbine engine comprising:
    an annular outer liner having a forward end and an aft end;
    an annular inner liner having a forward end and an aft end, and spaced radially inwardly from said outer liner to define therebetween a combustion zone and an annular outlet between said outer and inner liner aft ends;
    a plurality of circumferentially spaced tubular domes fixedly joined to and spaced between said outer and inner liner forward ends, each of said domes including:
        an annular inlet at a forward end of said dome for receiving a portion of said compressed airflow as pilot airflow;
        a swirler fixedly disposed inside said dome and having a central tubular ferrule for receiving a first portion of said pilot airflow, and a plurality of circumferentially spaced primary swirl vanes for receiving and swirling a second operation of said pilot airflow; and
        an outlet disposed at an aft end of said dome in flow communication with said combustion zone;
    a plurality of pilot fuel injectors, each disposed in a respective one of said domes for injecting pilot fuel into said pilot airflow second portion for mixing therewith and for mixing with said pilot airflow first portion discharged from said ferrule for generating a pilot fuel/air mixture dischargeable from said dome outlets;
    a plurality of main fuel spraybars extending between said domes and said outer and inner liners for injecting main fuel into a portion of aid compressed airflow channeled between said domes and said outer and inner liners as main airflow for generating a main fuel/air mixture dischargeable concentrically around said pilot fuel/air mixtures;
    means or igniting said pilot fuel/air mixtures for generating pilot combustion gases in said combustion zone, said pilot combustion gases being effective for igniting said main fuel/air mixture for generating main combustion gases in said combustion zone;
    an annular outer cowl extending upstream from said outer liner forward end and spaced from said domes to define therebetween an outer flowpath having an outer inlet for receiving a portion of said main airflow as outer main airflow, and an outer outlet for discharging a portion of said main fuel/air mixture as an outer main fuel/air mixture into said combustion zone for generating outer main combustion gases; and
    an annular inner cowl extending upstream from said inner liner forward end and spaced radially from said domes to define therebetween an inner flowpath having an inner inlet for receiving a portion of said main airflow as inner main airflow, and an inner outlet for discharging a portion of said main fuel/air mixture as an inner main fuel/air mixture into said combustion zone for generating inner main combustion gases.

2. A combustor according to claim 1 wherein each of said domes further includes a circumferential gutter extending circumferentially from said dome and having diverging outer and inner legs joined together at a first leading edge for mixing said pilot combustion gases and said outer and inner main combustion gases.

3. A combustor according to claim 2 wherein said circumferential gutter includes a first gutter outlet defined at aft ends of said outer and inner legs, said first gutter outlet being disposed in a common axial plane with said dome outlet.

4. A combustor according to claim 3 wherein said dome further includes a pair of recesses extending upstream from said dome outlet for allowing said pilot fuel/air mixture to spread circumferentially inside said circumferential gutter and be discharged from both said dome outlet and said first gutter outlet.

5. A combustor according to claim 2 wherein adjacent ones of said circumferential gutters are circumferentially spaced from each other to define a circumferential gap for accommodating differential thermal movement therebetween.

6. A combustor according to claim 2 wherein each of said domes further includes a radial gutter extending radially from said dome and having diverging first and second side legs joined together at a second leading edge for additionally mixing together said main fuel with said outer and inner main airflows, respectively.

7. A combustor according to claim 6 wherein said radial gutter includes a second gutter outlet defined at aft ends of said first and second side legs, said second gutter outlet being disposed upstream of said dome outlet at a setback distance for increasing mixing of said main fuel and said outer and inner main airflows.

8. A combustor according to claim 2 wherein each of said swirlers further includes a plurality of circumferentially spaced secondary swirl vanes disposed downstream of said primary swirl vanes for receiving and swirling a third portion of said pilot airflow, said pilot airflow third portion being discharged from said secondary swirl vanes concentrically around said pilot fuel and said pilot airflow first and second portions for mixing therewith to generate said pilot fuel/air mixture dischargeable from said dome outlet.

9. A combustor according to claim 2 wherein each of said pilot fuel injectors includes an injector outlet disposed adjacent to a pair of said primary swirl vanes for discharging said pilot fuel into said primary swirl vanes for mixing with said pilot airflow second portion.

10. A combustor according to claim 9 wherein each of said pilot fuel injectors extends tangentially to said primary swirl vanes.

11. A combustor according to claim 9 wherein said pilot fuel injectors are configured in pairs, with each pair providing pilot fuel to a respective one of said swirlers.

12. A combustor according to claim 2 wherein each of said main fuel spraybars includes:
 a proximal end joined to an outer casing surrounding said combustor;
 a distal end disposed adjacent to said inner cowl; and
 a plurality of radially spaced spraybar fuel orifices positioned between said outer and inner cowls.

13. A combustor according to claim 12 wherein said spraybar orifices face in a circumferential direction for increasing mixing of said main fuel discharged therefrom with said outer and inner main airflows.

14. A combustor according to claim 13 wherein said spraybar orifices are configured in opposing pairs.

15. A combustor according to claim 2 wherein said pilot fuel/air mixture is rich and said outer and inner main fuel/air mixtures are lean.

16. A combustor according to claim 15 wherein said rich mixture has an equivalence ratio in a range of about 1.6 to about 1.8, and said lean mixtures have an equivalence ratio in a range of about 0.4 to about 0.6.

17. A combustor according to claim 2 wherein:
 said outer liner further includes an annular, aft facing outer step at said forward end thereof;
 said inner liner further includes an annular, aft facing inner step at said forward end thereof; and
 said outer and inner steps being effective for providing flameholding of said outer and inner main combustion gases.

18. A combustor according to claim 17 wherein said circumferential gutters each include a gutter outlet at aft ends of said outer and inner legs, and said gutter outlet and said outer and inner steps are positioned at a common axial plane for providing flameholding of said pilot and outer and inner main combustion gases.

* * * * *